Dec. 7, 1926.
R. M. TRENT
1,609,894
COMBINED METERING AND CUT-OFF VALVE
Filed July 17, 1925    3 Sheets-Sheet 3

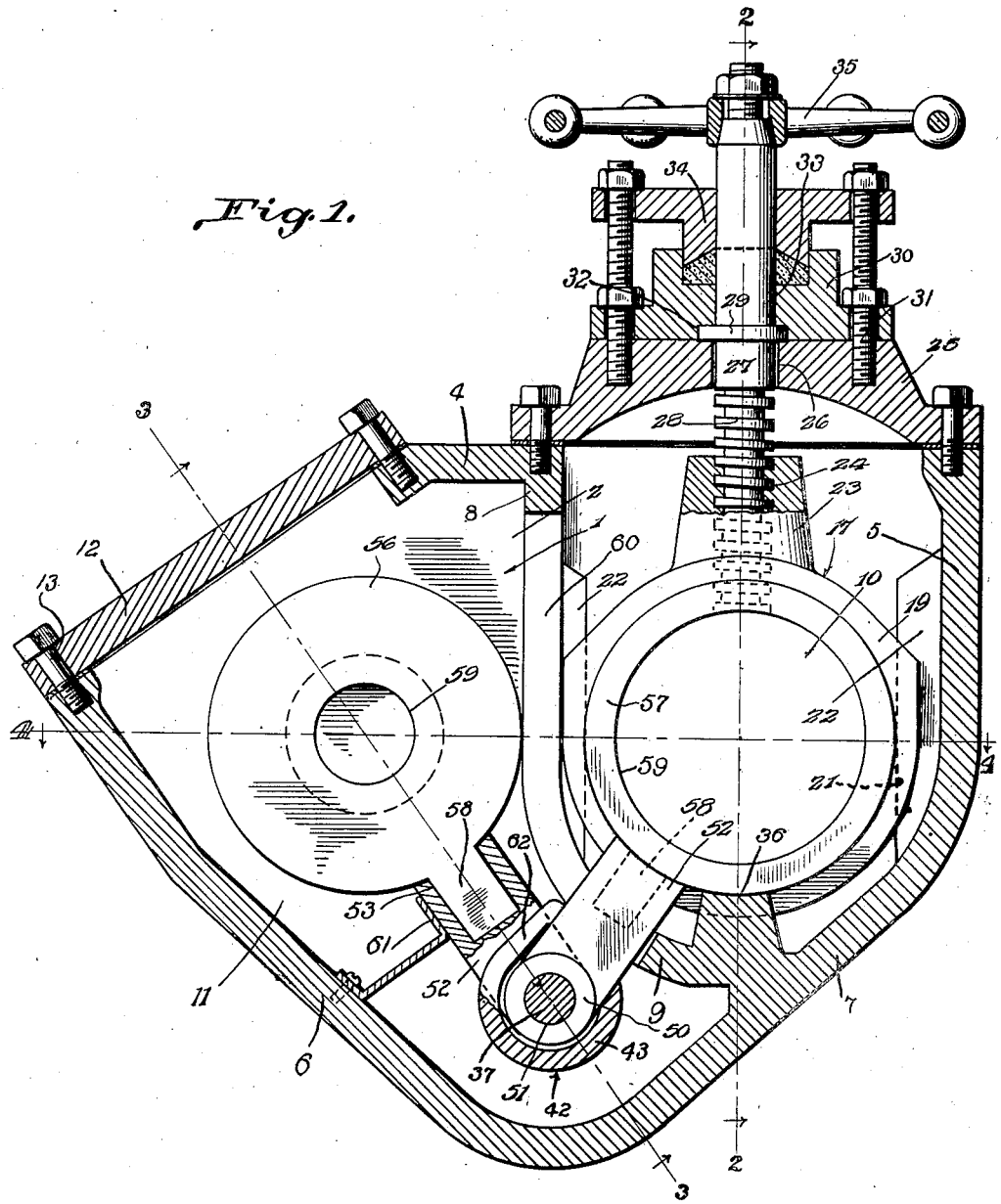

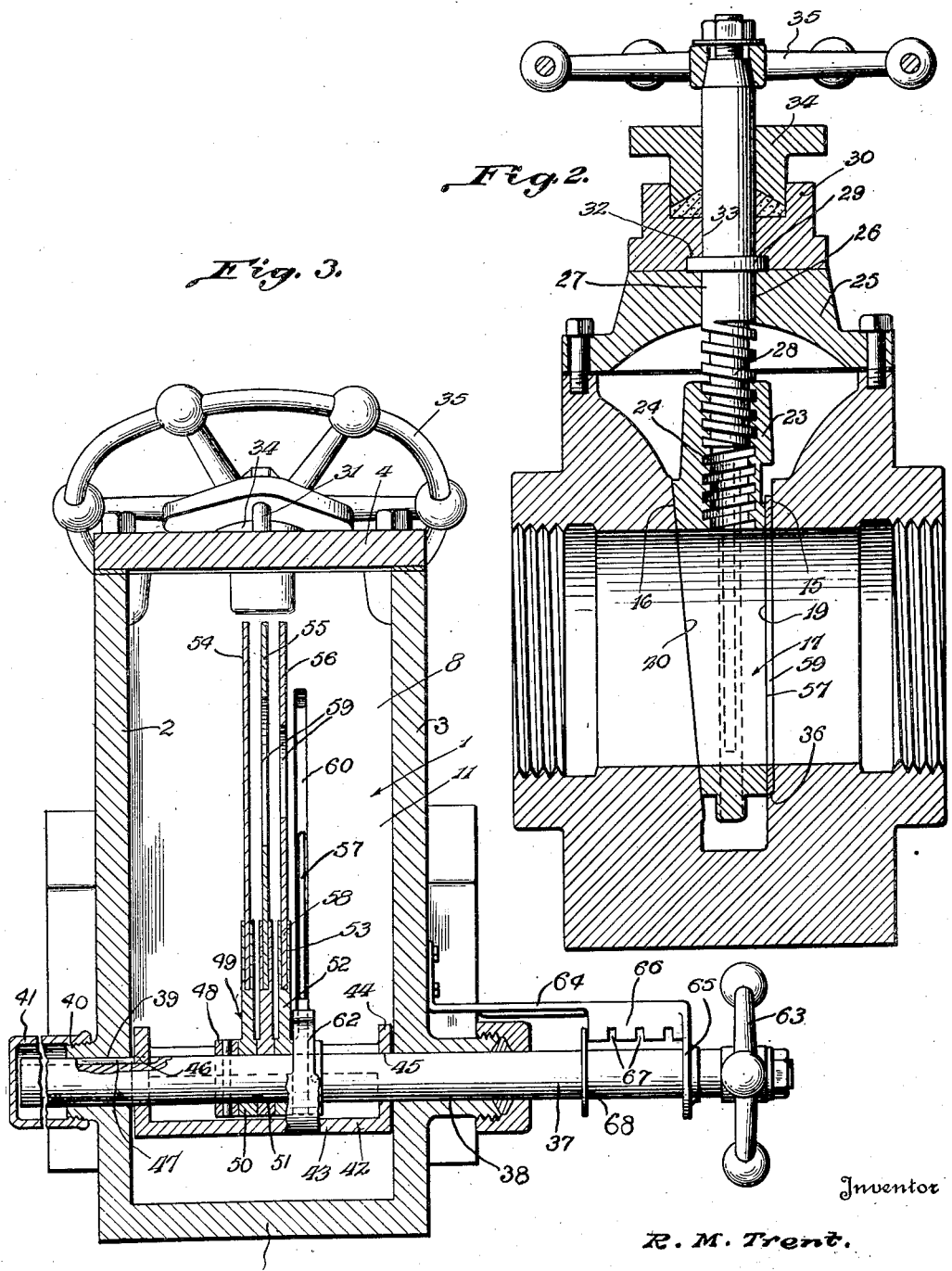

Inventor
R. M. Trent.
By
Lacey & Lacey, Attorneys

Patented Dec. 7, 1926.

1,609,894

UNITED STATES PATENT OFFICE.

ROBERT M. TRENT, OF LOS ANGELES, CALIFORNIA.

COMBINED METERING AND CUT-OFF VALVE.

Application filed July 17, 1925. Serial No. 44,310.

This invention relates to improvements in combined metering and cut-off valves and, while designed primarily for installation in conjunction with a recording differential and static pressure orifice meter for accurately measuring liquids or gases passing through pipe lines, it may be employed in other connections.

One of the objects of the invention is to embody in a single valve, means whereby any one of a number of plates having openings of different diameters therein, or a cut-off plate, may be selectively positioned in the line of flow of fluid through the valve, through the medium of an adjusting means operable exteriorly of the valve, thereby enabling the flow to be regulated and the rate of flow varied, or the flow completely cut off, without the necessity of opening or disconnecting any part of the supply system.

The valve embodying the invention comprises a plurality of flow controlling plates having openings of different diameters, and an imperforate cut off plate, together with means whereby the plates may be selectively positioned in the line of flow of fluid through the valve, and another object of the invention is to so construct the valve that the apertured plates may be removed therefrom and plates having apertures of other diameters substituted therefor, without permitting the escape of gas or other fluid.

Another object of the invention is to so construct the valve that while the plates may be selectively positioned in the path of flow of the fluid passing through the valve, and this adjustment may be effected as frequently as required, there will be no leakage of the fluid occasioned through such adjustment.

In the accompanying drawings:

Figure 1 is a vertical sectional view through the valve embodying the invention.

Figure 2 is a transverse sectional view taken substantially on the line 2—2 of Figure 1, looking in the direction indicated by the arrows.

Figure 3 is a similar view on the line 3—3 of Figure 1, looking in the direction indicated by the arrows.

Figure 4:
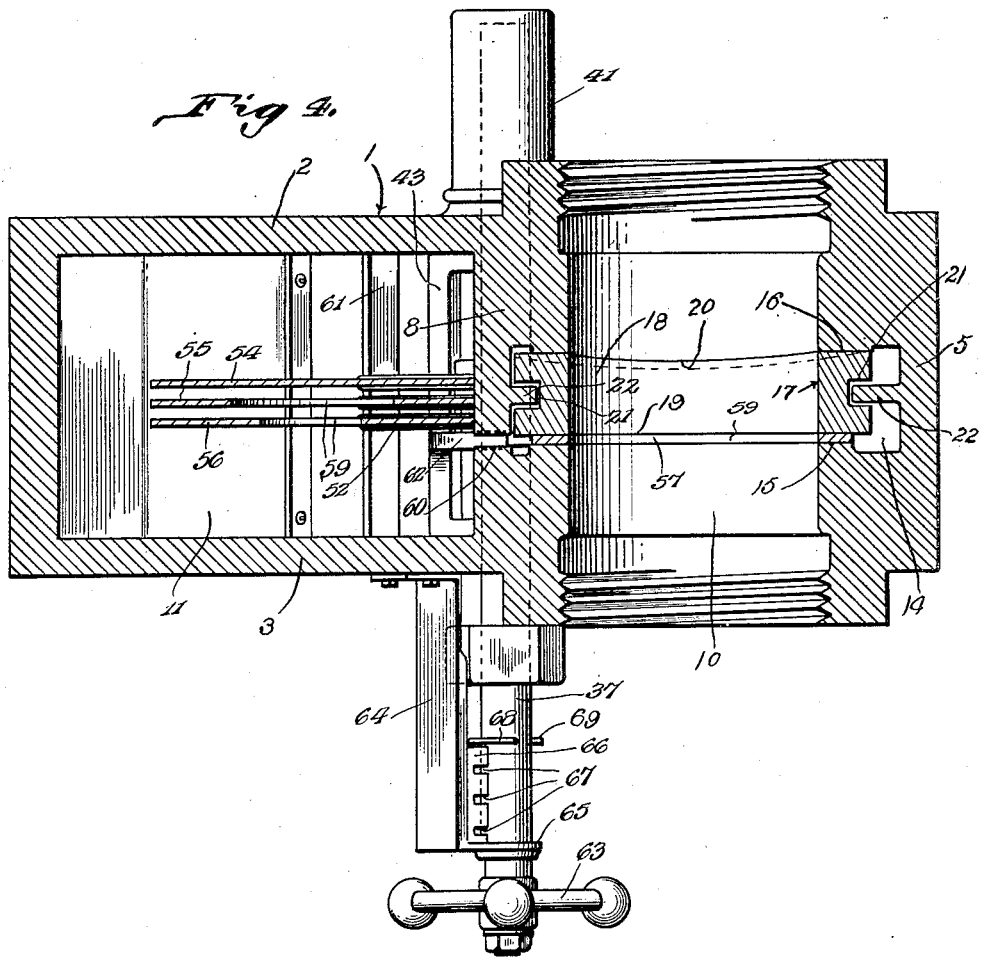
Figure 4 is a horizontal sectional view on the line 4—4 of Figure 1, looking in a downward direction.

In the drawings, the valve casing, which is indicated by the numeral 1, is illustrated as including spaced side walls 2 and 3, a top wall 4, an upright wall 5, and a bottom including upwardly diverging or inclined wall portions 6 and 7. A partition wall 8 extends between the side walls 2 and 3 and vertically downwardly from the under side of the top wall 4 of the casing, and the lower portion of the partition wall is curved as at 9, to meet the bottom wall portion 7, so that the interior of the casing is so divided as to provide a cylindrical passageway 10 opening through its opposite sides and through which the fluid is to be delivered, the side walls 2 and 3 of the casing at the ends of the passageway being provided with any suitable means adapting the casing for the connection thereto of the sections of the pipe constituting the gas main. Likewise, the partition wall 8 provides between it and the bottom wall portion 6 and the side walls 2 and 3 and top wall 4, a compartment 11 in which the plates and the adjusting means therefor are housed, and for a purpose to be presently explained, this compartment is open at its upper side and a closure or cap plate 12 is fitted thereto and removably held in place by bolts 13.

The casing is formed interiorly, at that side of the partition wall 8 at which the fluid passageway 10 is located, with a relatively narrow chamber 14 which is intersected by and in communication with the passageway 10. One wall of the chamber 14, indicated by the numeral 15, occupies a vertical plane or, in other words, a plane at right angles to the axis of the passageway 10, and the opposite wall of the chamber, indicated by the numeral 16, is located in an inclined plane converging downwardly toward the plane of the wall 15. In order that the plates, to be presently described, may be held in place against the wall 15 of the chamber 14, and the escape of gas or other fluids from the passageway 10, except by direct passage, be prevented, a wedge device is provided and is indicated in general by the numeral 17.

The wedge device referred to above comprises a substantially annular body 18 having one side, indicated by the numeral 19, plane and presented to the wall 15 of the chamber 14, and its other side, indicated by the numeral 20, disposed in a plane inclined to correspond to the inclination of the wall 16 of the chamber. The body 18 is formed in the opposite sides of its periphery with grooves 21, and guiding ribs 22 are formed upon the opposite side walls of the chamber 14 and engage in the grooves. At its top the body 18 is formed with a boss 23, and a threaded bore 24 is formed in the boss and in the top portion of the body, the threads of the bore being preferably of the square coarse type. A cap closure 25 is secured removably in a fluid-tight manner to the top of the valve casing and closes the upper side of the chamber 14, the closure cap 25 having an opening 26 formed therein, and a stem 27 being rotatably fitted in said opening, the portion of the stem which extends below the closure cap 25 being threaded, as at 28, to fit the threads of the bore 24. The stem 27 is provided with a circumscribing collar 29 which rests upon the upper side of the closure cap 25, and a retaining cap member 30 is secured, preferably by set bolts 31, upon the upper side of the closure cap 25 and is recessed as at 32 to accommodate said collar 29, so that the stem 27 is prevented from displacement longitudinally in the opening 26, although it may be freely rotated. The cap member 30 is, of course, provided with an opening 33 into which the stem extends, and a packing gland 34 is provided about the upper portion of the stem and coacts with the cap member 30 to prevent leakage of gas or other fluids past the stem. A hand wheel 35 is fixed upon the upper end of the stem and affords means whereby the stem may be rotated for the purpose of vertically adjusting the wedge body 18. By reference to Figure 2 of the drawings, it will be observed that the wall 15 of the chamber 14 is formed at its lower side with a stop shoulder which is indicated by the numeral 36, this shoulder being of arcuate form as clearly shown in Figure 1. The purpose of this shoulder will presently be explained.

Figure 5:
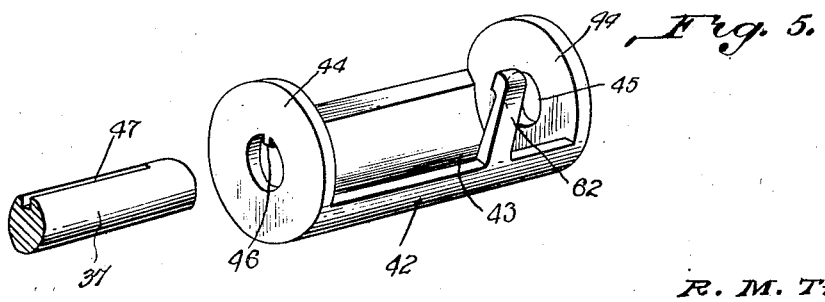
Figure 5 is a perspective view illustrating a part of the plate adjusting means.

As previously stated, the chamber 11 of the valve casing is designed to house the flow controlling plates and the means provided for selectively presenting these plates at the fluid passageway 10 of the valve, and these devices will now be described. The numeral 37 indicates a shaft which is slidably and rotatably fitted at its intermediate portion through a stuffing box 38 upon the side wall 3 of the casing, the shaft extending transversely across the interior of the casing and through an opening 39 in the wall 2 of the casing, this wall being provided with a threaded boss 40 to which is fitted a tubular cap 41 into which the corresponding end of the shaft extends. Figure 5 of the drawings illustrates a tumbler which is indicated in general by the numeral 42 and which is assembled with the shaft 37, the tumbler comprising a substantially semi-cylindrical hollow body portion 43 provided at its ends with heads 44 which are circular in shape and are provided with openings 45 for the passage of the shaft. A lug 46 is provided upon the wall of one of the openings 45 and engages slidably in a groove 47 formed longitudinally in the said shaft 37, so that the tumbler is connected for rotation with the shaft and at the same time, the shaft may be slid longitudinally in its bearings, the tumbler, however, being held against such movement with the shaft by the engagement of its heads 44 against the inner faces of the side walls 2 and 3 of the valve casing. Collars 48 are secured to the shaft 37 in spaced relation to each other, and a plurality of plate carriers, indicated in general by the numeral 49, are arranged upon the shaft between said collars. Each of the carriers 49 comprises a hub portion 50 of circular disc-like form having an opening 51 therein freely receiving the shaft 37. An arm 52 extends radially from each of the hub portions 50 and each arm is formed with a narrow flat-walled socket 53 opening through its outer end. The flow controlling plates are indicated by the numerals 54, 55, 56 and 57, and each of these plates is of circular form and each is provided with a flat-sided tang or shank 58 removably frictionally fitted into the socket 53 of the respective arm 52. One of the plates, as for example the plate 54, is imperforate, whereas the other plates are formed with axially located openings 59, and the openings in the plates 55, 56 and 57 are of varying diameters. The plates 54 to 57 inclusive are of a diameter greater than the diameter of the fluid passage 10 and it will be observed by reference to Figure 2, that a selected one of these plates may be positioned to rest flat against the wall 15 of the chamber 14 and be clamped in place by the wedge body 18. Any desired number of plates may be provided and their apertures may be of any desired diameter. However, it is preferable that one of the plates, as for example the plate 57, have its aperture 59 of a diameter equal substantially to the diameter of the fluid passage 10, so that when this particular plate is in position, as shown in Figures 2 and 4 of the drawings, the wall of its aperture will register with the bore or passage 10 and the passage of gas or other fluid through the passage 10 will be unrestricted. In order that the plates may be selectively brought to the position stated and with the periphery of the selected plate resting at its lower side upon the shoulder 36, as seen in Figures 1 and 2 of the drawings, the partition wall 8 is formed with a vertical slot indicated by the numeral 60.

By reference to Figure 1 of the drawings, it will be understood that should the shaft 37 be rotated to the left, one edge of the wall of the cylindrical body 43 of the tumbler 42 will be brought into engagement with the arm 52 of that one of the carriers 49 which carries the plate at that time in active position, and the carrier or supporting member 49 will be rotated so as to swing the plate on an arc through the slot 60 until the arm of its supporting member rests, together with the arms of the supporting members for the other plates, upon a rest member 61 which is mounted upon the inner side of the bottom wall section 6 of the casing of the valve. Before such movement of the active plate can take place, however, it is necessary that the stem 27 be rotated so as to elevate the wedge body 18 and thus relieve the plate of pressure. In order that any desired one of the plates may be brought into action, the tumbler body 43 is provided upon the opposite or other edge of its wall with a pick-up finger 62 which extends from said edge of the wall and is of a thickness such that when the shaft 37 is longitudinally adjusted, the finger may engage at its end against the arm 52 of one or another of the plate supporting members 49 without coming into engagement with the arms of any of the other plate supporting members. When the shaft has been properly longitudinally adjusted to bring the finger 62 of the tumbler 42 opposite the arm of the plate supporting member which is to be rotated, the shaft 37 may then be rotated, through the medium of a hand wheel 63 upon its outer end, to effect rotation of the tumbler and cause the finger 62 to pick up and swing the arm of the supporting member in a manner to move the plate carried thereby through the slot 60 and into position between the wall 15 of the chamber 14 and the face 19 of the body 18 of the wedge, whereupon the stem 27 may be rotated to force the wedge downwardly and cause the said face 19 thereof to firmly bind against the peripheral portion of the plate.

In order that it may be determined when the finger 62 is opposite the plate carrier which it is desired to adjust, a bracket 64 is mounted upon the side wall 3 of the casing and is provided with a bearing portion 65 at its outer end in which the shaft is rotatably and slidably fitted, and the said bracket is formed with a flange 66 having a series of notches 67 therein. A relatively thin collar 68 is fixed or formed upon the shaft 37 and is of circular form and provided in its periphery with a notch 69. By reference now to Figure 3 of the drawings, it will be understood that when the shaft is rotated to such position that the notch 69 will be in alinement with the flange 66, the shaft may be drawn outwardly or pushed inwardly, the notch being so positioned that when it is in alinement with said flange, the plate carriers will all be in position resting upon the support 61. When the shaft has been slid to position with the collar 68 opposite one or another of the notches 67, or opposite the inner end of the flange 66, depending upon which one of the carriers is to be adjusted, the shaft 37 is rotated, thus effecting rotation of the tubuler 42 and movement of its finger 62 to effect swinging movement of the selected plate carrier.

From the foregoing description of the invention it will be seen that there is provided a combined cut-off or gate valve and metering valve which may be readily adjusted in a few moments' time to vary the rate of flow of gaseous or other fluid through the passageway 10 of the valve, or to completely close the said passageway and cut off the flow. It will likewise be evident that in effecting such adjustment, there can be no escape of the fluid. Furthermore, the adjustments are effected exteriorly of the valve casing and removal of any part of the casing is unnecessary.

It will further be observed, and particularly by reference to Figure 1 of the drawings, that should it be desired to substitute a group of plates having apertures of varying diameters for another group of plates having varying diameters, this may be readily effected by removing the closure 12 of the chamber 11 and extracting the plates then present in the valve, and inserting the new plates, the shanks 58 of the plates being held only frictionally in the sockets 53. In making the substitution, one of the plates, as for example the plate 57, the aperture of which is of the same diameter as the passageway 10, may be in active position and inasmuch as the wedge 17, when properly adjusted, effects a fluid-tight joint about the plate, there can be no escape of fluid into the chamber 11.

Having thus described the invention, what I claim is:

1. A casing having a passageway for the flow of fluid therethrough, and having a valve seat in the length of the passageway, a plurality of flow controlling plates pivotally and slidably mounted at one side of the passageway, means for sliding the plates to bring the desired plate opposite the valve seat and means for turning the selected plate to seat the same.

2. In a valve of the class described, a valve casing having a fluid passageway therein, a compartment at one side of the pasasgeway divided therefrom by a partition wall having a slot therein, a plurality of flow-controlling elements in the compartment, and means operable to shift the said elements to selectively position the same opposite the slot and move the selected element through the slot and into position to control the flow of fluid through the passageway.

3. In a valve of the class described, a casing having a fluid passageway therein, a compartment at one side of the passageway divided therefrom by a partition wall having a slot therein, a plurality of flow-controlling elements in the compartment, a shaft slidably and rotatably mounted in the walls of the casing and supporting the said elements, means coacting with the elements to shift the same when the shaft is slid, whereby the elements may be selectively brought to position opposite the slot, and means operable through rotation of the shaft to coact with the selected elements to move the same through the slot into position to control the flow of fluid through the passageway.

4. In a valve of the class described, a casing having a fluid passageway therein, a compartment at one side of the passageway divided therefrom by a partition wall having a slot therein, a plurality of flow-controlling elements in the compartment, a shaft slidably and rotatably mounted in the walls of the casing and supporting the said elements, means coacting with the elements to shift the same when the shaft is slid, whereby the elements may be selectively brought to position opposite the slot, means operable through rotation of the shaft to coact with the selected elements to move the same through the slot into position to control the flow of fluid through the passageway, and means for preventing sliding movement of the shaft after the same has been slidably adjusted and rotated.

5. In a valve of the class described, a casing having a fluid passageway therein, a compartment at one side of the passageway divided therefrom by a partition wall having a slot therein, a shaft rotatably and slidably mounted in the walls of the casing, a plurality of flow-controlling elements housed within the compartment and rotatable with relation to the shaft, means restraining the elements from displacement longitudinally of the shaft, and means operable through rotation of the shaft to move a selected one of the said elements through the slot and into position to control the flow of fluid through the passageway.

6. In a valve of the class described, a casing having a fluid passageway therein, a compartment at one side of the passageway divided therefrom by a partition wall having a slot therein, a shaft rotatably and slidably mounted in the walls of the casing, a plurality of flow-controlling elements rotatably supported upon the shaft and shiftable with relation to the said slot when the shaft is slidably adjusted, whereby a selected one of the elements may be positioned opposite the slot, and means operating through rotation of the shaft to engage the selected one of said elements and move the same through the slot into position to control the flow of fluid through the passageway.

7. In a valve of the class described, a casing having a fluid passageway therein, a compartment at one side of the passageway divided therefrom by a partition wall having a slot therein, a shaft slidably and rotatably mounted in the walls of the casing compartment, a tumbler rotatable with the shaft and held against movement with the shaft in the sliding adjustment of the latter, a plurality of flow-controlling elements rotatably supported upon the shaft, means restraining the said elements from movement longitudinally of the shaft, whereby in the sliding adjustment of the shaft, the said elements may be selectively brought to position opposite the said slot, the tumbler having a portion to engage the elements when the shaft is rotated in one direction, whereby to move the said elements away from said partition wall, and means upon the tumbler located opposite the slot and arranged, in the rotation of the shaft in the other direction, to engage the selected element and move the same through the slot and into position to control the flow of fluid through the passageway.

8. In a valve of the class described, a casing having a fluid passageway therein, a compartment at one side of the passageway divided therefrom by a partition wall having a slot therein, a shaft slidably and rotatably mounted in the walls of the compartment, a tumbler mounted upon the shaft within the compartment and rotatable with the shaft, the shaft being slidable independently of the tumbler, the tumbler having a finger located at one side of its axis and opposite the slot, a plurality of supporting members rotatably mounted upon the shaft, means restraining the members from movement longitudinally of the shaft, whereby, in the sliding movement of the shaft, the supporting members may be selectively brought opposite the slot and between the same and the said finger, and an element supported by each of the said supporting members for movement through the slot and into position to control the flow of fluid through the passageway, upon rotation of the shaft in a direction to effect coaction of said finger of the tumbler with the corresponding supporting member.

9. In a valve, a casing having a passageway for the flow of fluid therethrough, and provided in the length of the passageway with a valve seat, and having a lateral opening in line with the valve seat, a plurality of flow controlling plates, and means for selectively moving the plates to a position opposite the said lateral opening and operable to project the selected plate through the lateral opening to engage the valve seat for controlling the flow of fluid through the said passageway.

10. In a valve of the class described, a casing having a fluid passageway therein, a compartment at one side of the passageway divided therefrom by a partition wall having a slot therein, a shaft slidably and rotatably mounted in the walls of the compartment, a tumbler mounted upon the shaft within the compartment and rotatable with the shaft, the shaft being slidable independently of the tumbler, the tumbler having a finger located at one side of its axis and opposite the slot, a plurality of supporting members rotatably mounted upon the shaft, means restraining the members from movement longitudinally of the shaft, whereby, in the sliding movement of the shaft, the supporting members may be selectively brought opposite the slot and between the same and the said finger, an element supported by each of the supporting members for movement through the slot and into position to control the flow of fluid through the passageway, upon rotation of the shaft in a direction to effect coaction of said finger of the tumbler with the corresponding supporting member, and means for maintaining the shaft in positions of sliding adjustment, the said means comprising a member extending beside the shaft and having a series of notches therein, and a collar upon the shaft having a notch in its periphery to permit it to clear the said notched member in one position of rotation of the shaft and permit of sliding adjustment of the shaft, the periphery of the collar being engageable selectively in the notches through sliding adjustment of the shaft and rotation thereof.

11. In a valve of the class described, a casing having a fluid passageway therein, a compartment at one side of the passageway divided therefrom by a partition wall having a slot therein, a shaft rotatably and slidably mounted in the walls of the compartment, a plurality of supporting members mounted upon the shaft and each comprising a hub portion rotatably fitting the shaft and an arm extending from the hub portion and provided with a socket, means upon the shaft for preventing displacement of the said hub portions longitudinally thereof, whereby the supporting members will be movable with the shaft in the sliding adjustment of the latter and whereby the said supporting members may be selectively brought opposite the said slot, a flow controlling element associated with each of the supporting members and comprising a circular plate and a tang extending from the plate and removably fitted in the socket of the respective arm, and means actuated through rotation of the shaft to rotate the supporting member which is opposite the slot, in a manner to move the flow-controlling element carried thereby through the slot and into position to control the flow of fluid through the passageway.

12. In a valve of the class described, a casing having a fluid passageway therein, a compartment at one side of the passageway divided therefrom by a partition wall having a slot therein, a shaft rotatably and slidably mounted in the walls of the compartment, a plurality of supporting members mounted upon the shaft and each comprising a hub portion rotatably fitting the shaft and an arm extending from the hub portion and provided with a socket, means upon the shaft for preventing displacement of the said hub portions longitudinally thereof, whereby the supporting members will be movable with the shaft, in the sliding adjustment of the latter, and whereby the said supporting members may be selectively brought opposite the said slot, a flow-controlling element associated with each of the supporting members and comprising a circular plate and a tang extending from the plate and removably fitted in the socket of the respective arm, and means actuated through rotation of the shaft to rotate the supporting member which is opposite the slot, in a manner to move the flow-controlling element carried thereby through the slot and into position to control the flow of fluid through the passageway, certain of said flow-controlling valve plates having apertures of different diameters therein and another one of said plates being imperforate.

13. In a valve of the class described, a casing having a fluid passageway therein, the casing having a chamber intermediate the ends of the passageway, the chamber having a wall occupying a plane intersecting the axis of the passageway and a wall opposed to the first mentioned wall and inclined with relation thereto, a wedge member adjustable within the chamber and having an opening of substantially the same diameter as the bore of the passageway and normally alined therewith, the wedge member having a face opposing the first mentioned wall of the chamber and an inclined face opposing the inclined wall of the chamber, a plurality of flow-controlling plates, means operable to selectively position the plates between the wedge member and the first mentioned wall of the chamber, and means for adjusting the wedge member to bind the said plates in position.

14. In a valve of the class described, a casing having a fluid passageway therein, the casing having a chamber intermediate the ends of the passageway, the chamber having a wall occupying a plane intersecting the axis of the passageway and a wall opposed to the first mentioned wall and inclined with relation thereto, a wedge member adjustable within the chamber and having an opening of substantially the same diameter as the bore of the passageway and normally alined therewith, the wedge member having a face opposing the first mentioned wall of the chamber and an inclined face opposing the inclined wall of the chamber, a plurality of flow-controlling plates, means operable to selectively position the plates between the wedge member and the first mentioned wall of the chamber, and means for adjusting the wedge member to bind the said plates in position, the said means comprising a manually rotatable threaded stem mounted in a wall of the casing radial to the axis of the wedge member, and means restraining the stem against longitudinal movement in its bearing in said wall, the said wedge member having a threaded socket accommodating the threaded portion of the stem.

In testimony whereof I affix my signature.

ROBERT M. TRENT. [L. S.]